(12) United States Patent
Velasco et al.

(10) Patent No.: US 7,246,133 B2
(45) Date of Patent: Jul. 17, 2007

(54) SYSTEM OF ASSIGNING DOMAIN NAMES (DNS) PROVIDING ACCESS TO DATABASES

(75) Inventors: Jaime Bustillo Velasco, Madrid (ES); Juan Miguel Santos Hidalgo, Merida (ES)

(73) Assignee: Vodaphone Group PLC (GB)

( * ) Notice: Subject to any disclaimer, the term of this patent is extended or adjusted under 35 U.S.C. 154(b) by 357 days.

(21) Appl. No.: 10/483,912

(22) PCT Filed: Jul. 12, 2002

(86) PCT No.: PCT/ES02/00352

§ 371 (c)(1),
(2), (4) Date: Jan. 15, 2004

(87) PCT Pub. No.: WO03/009546

PCT Pub. Date: Jan. 30, 2003

(65) Prior Publication Data

US 2004/0199510 A1    Oct. 7, 2004

(30) Foreign Application Priority Data

Jul. 16, 2001   (ES) ............................... 200101660

(51) Int. Cl.
*G06F 7/00* (2006.01)
*G06F 17/00* (2006.01)
*G06F 15/16* (2006.01)

(52) U.S. Cl. ...................... 707/102; 709/245

(58) Field of Classification Search ............... 707/102, 707/100, 1, 3; 709/245
See application file for complete search history.

(56) References Cited

U.S. PATENT DOCUMENTS 6,131,095 A    10/2000 Low et al.
6,201,965 B1 *  3/2001 Mizell et al. ............... 455/433
6,470,332 B1 * 10/2002 Weschler ....................... 707/3
6,654,607 B1 * 11/2003 Shobatake et al. .......... 455/433

FOREIGN PATENT DOCUMENTS

| JP | 11 284667 | 10/1999 |
| JP | 2003 349747 | 12/2002 |
| WO | WO 01 15397 | 3/2001 |
| WO | WO 01 58186 | 8/2001 |

OTHER PUBLICATIONS

Jin Yang and Ioannis Kriaras. Wireless VoIP: Opportunities and Challenges. MDA'99 LNCS 1748, pp. 3-13, 1999.*

* cited by examiner

*Primary Examiner*—Sam Rimell
*Assistant Examiner*—Cory Bell
(74) *Attorney, Agent, or Firm*—Ostrolenk, Faber, Gerb & Soffen, LLP

(57) ABSTRACT

A system which allows the Internet address assigned to a destination equipment to be obtained, starting from its identification name, such as is carried out conventionally with the DNS protocol, and which also allows different information to be obtained on the destination equipment starting from its identification name, as for example can be information contained in databases of mobile telephony networks or in a database belonging to a data network. The system comprises a request administration means which is connected to a means of analysis of at least one parameter of the DNS protocol and at least one database message composition/reception module that is connected to at least one external database and also including means of analysis of the answer of the at least one external database and of an internal database to deliver the information requested by using the DNS protocol.

10 Claims, 2 Drawing Sheets

SYSTEM OF ASSIGNING DOMAIN NAMES (DNS) PROVIDING ACCESS TO DATABASES

CROSS-REFERENCE TO RELATED APPLICATIONS

This application is a national stage filing pursuant to 35 U.S.C. § 371 of PCT application PCT/ES02/00352 which, in turn, claims priority to Spanish Patent Application No. P200101660 filed Jul. 16, 2001.

OBJECT OF THE INVENTION

The invention relates to a domain naming system (DNS) the object of which is to enable access to external databases, to obtain any type of information regarding a destination equipment starting from an identification name of said destination equipment, and all this independently of being able also to obtain the Internet (IP) address assigned to a destination equipment, starting from the identification name of said destination equipment, such as is carried out presently with conventional systems (DNS).

Thus for example the system (DNS) of the invention allows access to databases of mobile telephony networks to obtain information regarding any subscriber, or access to databases of data networks to obtain any type of information of the destination equipment, and all starting from an identification name of said destination equipment.

Thus access is allowed through Internet by means of a system (DNS) to different databases.

BACKGROUND OF THE INVENTION

At the present time, Internet is a network that has extended all over the world, as there is a growing number of users that access the same from any part of the world, for which it is only necessary to have a terminal equipment with connection to this network. If a user that has this terminal equipment (requesting equipment), wants to be connected with another user (destination equipment), it is necessary to know the numerical IP address of said destination equipment. However, instead of using the IP addresses that are more complicated to retain and manage, names are used to identify each one of the user equipments. This makes necessary the use of a mechanism which, starting from an identification name of the destination equipment with which it is desired to communicate, allows the numerical IP address to be obtained. For this a standardised protocol is employed called the domain naming system (DNS), in which the requesting equipment, before setting up a connection with the destination equipment, queries a DNS server to obtain the IP address. If this server does not have the requested data, it queries another DNS server, or else the actual DNS server that was consulted in the first place, returns the necessary information for querying another DNS server to obtain the desired information. This process can be repeated successively until the IP address is obtained, for which reason the requesting equipment should have the address in store of at least one DNS server, starting from which it will be possible to obtain the IP address of the destination equipment with which it is desired to set up a connection.

The identification names of the terminal equipments are represented by labels separated by dots, so that each one of these labels represents a domain in the network. These domains are tree-structured, so that when a DNS server is consulted, and the latter does not have the required information, it knows what DNS server should be consulted by analysing the different domains of the name, since each server possesses information of an area of the network.

The information that the server queries is stored in an internal database called "Master Files", so that these databases are distributed over the different DNS servers, as each one of them has information of an area of the network. The information that these databases contain refers to the identification names and IP addresses of each of the user terminals of the network.

The DNS protocol is formed by a header, a field to make the query, another for the answer, another to request authorization, and a last one to include additional information. In each of these fields a series of standardised parameters is included, among which should be mentioned the parameter QNAME that is part of the query field, and which contains the identification name of the destination equipment of which the information is requested, or the parameter RDATA that contains the information that has been requested.

In a mobile telephony or data network, various databases exist with information regarding different client equipments of said network, and due to the advance of information technologies, there is an increasing tendency toward combining telephony and data networks, for which reason it is becoming necessary to have access, in real time, to information of the terminal equipments of said networks to which presently access is only possible within the particular network in question. At the present time no system exists that allows access to different databases in order for example to be able to acquire information, through Internet, of a subscriber of a mobile telephony network or of a data network.

DESCRIPTION OF THE INVENTION

To overcome the aforementioned drawbacks, the invention has developed a new DNS system that allows access to be made to external databases.

This system is the most suitable, since the DNS protocol is widely used in Internet, and given its great extension, is well implanted, apart from being very lightweight, which implies that the burden on the network is low.

For this the system of the invention, the same as in conventional DNS systems, comprises query reception and answer transmission means that are the means with which the connection to Internet is made, and which also serve for receiving the query relative to the identification name of the destination equipment and sending the answer over the network, apart from supervising the connection with the requesting equipment that makes the query.

It further comprises means of data analysis of the DNS query that serve to analyse the query at protocol level checking that the query has the appropriate format and sends the information to a request administration means in which the different parameters of the queries are analysed and it is verified that the information is present in an internal database (Master Files) to which it has access.

Therefore the means of composing DNS messages serve to compose the DNS message to be sent, to provide an answer to the requesting equipment that made the query, and all this starting from the information provided by the means of data analysis of the DNS queries to the request administration means and that obtained by these means from the database.

The innovation of the invention is determined by the fact that it is characterised in that the request administration means are connected to a means of analysis of at least one parameter of the DNS protocol and to at least one module for composition/reception of database messages that is connected to at least one external database to detect, by means of the means of analysis of at least one parameter of the DNS protocol, queries to external databases and to obtain different items of information starting from the identification name of the destination equipment. The request administration means are also connected to means of analysis of the answer of the at least one external database and of the internal database depending on the database which has been accessed, in order to deliver the information requested to the means of DNS message composition and to send the information obtained from the destination equipment to the requesting equipment.

The parameter of the DNS protocol that is analysed pertains to the field dedicated to information requests. In this parameter information is also added regarding what database access is desired, and also in this same parameter information is included regarding the destination equipment on which information is requested, and the data item that it is desired to obtain on it.

In an embodiment of the invention the at least one DNS parameter analysed also includes information regarding a password (access key) to the information, so that after its verification access is allowed to this information. This verification is carried out in the request administration means.

In the preferred embodiment of the invention, the at least one parameter to analyse, is determined by the parameter that conventionally contains the identification name of the destination equipment of the DNS protocol, which parameter is known as (QNAME) such as was commented in the previous section.

In an embodiment of the invention, the external database is of a mobile telephony network, so that information can be obtained regarding the subscribers to said network, like for example the mobile subscriber telephone number (MSISDN).

In another embodiment of the invention, the external database is of a data network, for obtaining any other type of data on a destination equipment.

Therefore, the described structure of the invention, offers the great advantage that by means of the DNS protocol information can be obtained on other users of other networks, even though they are not users of the Internet network.

The invention also offers the innovation that the IP address can vary in a dynamic way and randomly as a function of the different connections of the destination equipment, and consequently it does not have to be a fixed address such as occurs in conventional DNS systems, but rather each time that the destination equipment makes a connection/disconnection, a new IP address is assigned to it that is stored in the external database.

The databases can be relational, in which the information is a planar structure in which a relationship exists between columns and rows, and equally the database can be a hierarchical database in which the information is structured by levels.

In the first case, i.e. in that in which the database is relational, at least one interface has been foreseen for external databases that are connected to at least one module for composition/reception of database messages, to allow querying this type of databases.

In the case in which the database is hierarchical, the structure described previously is used, i.e. the external database interface is not included.

The at least one interface of external relational databases is determined by APIs (Application Program Interfaces) of those used conventionally to serve as the link for communication between two non-compatible procedures, so that they allow communication to be established between these.

The invention comprises the possibility of including a plurality of modules for composition/reception of database messages and a plurality of external databases, to allow any information to be obtained on a destination equipment starting from its identification name.

Next, to permit a better understanding of this descriptive specification and being an integral part thereof, a series of figures is attached wherein by way of illustration and not restrictively the object of the invention has been represented.

DESCRIPTION OF THE PREFERRED EMBODIMENT

A description is provided below of the invention based on the previously commented figures.

Figure 1:
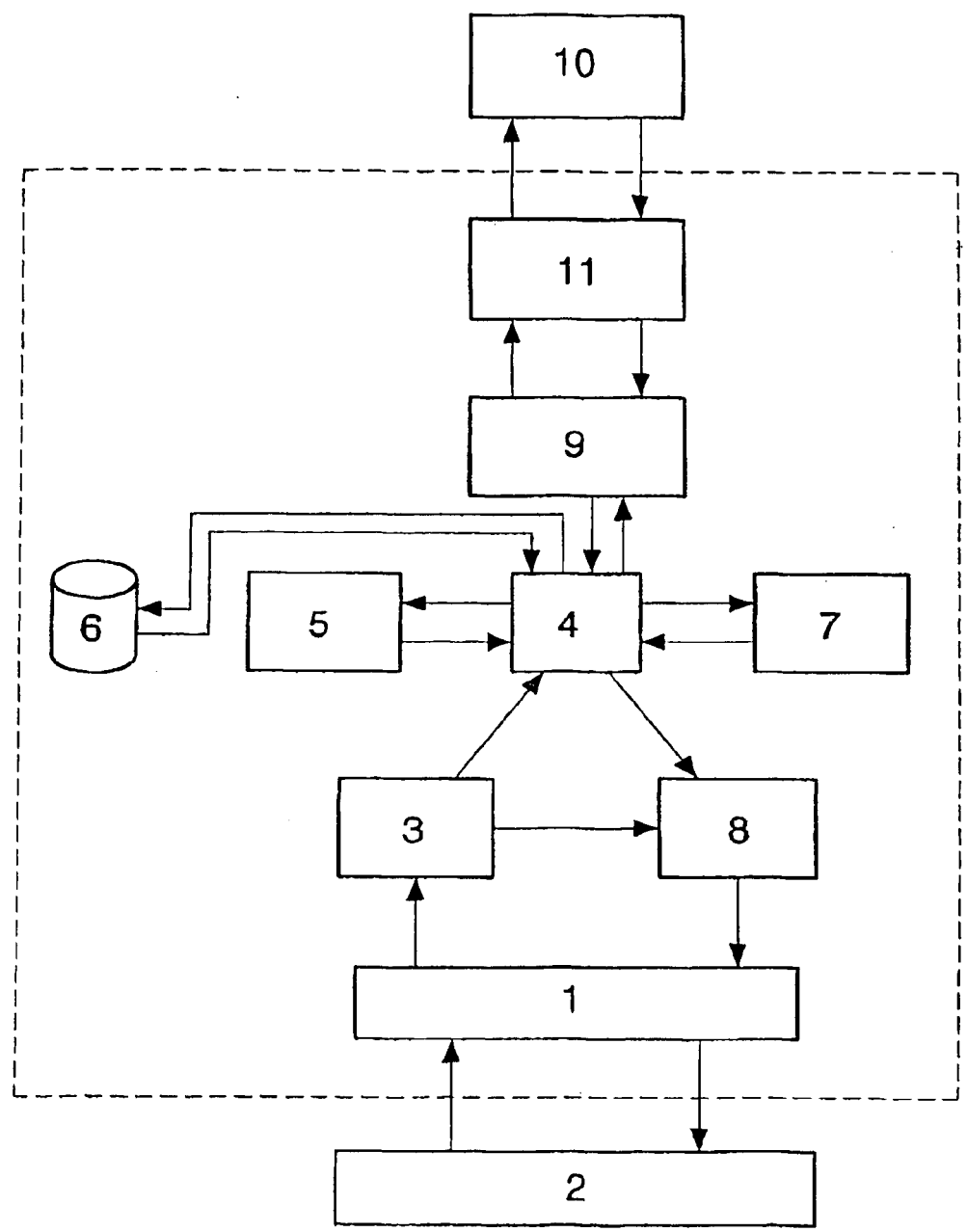
FIG. 1. Shows a functional block diagram of a possible example of embodiment of the system of the invention for access to external relational databases.

In FIG. 1 a possible example of embodiment is shown in which the DNS system is included inside the dashed lines, and which has a module for query reception and answer transmission 1 by means of which the connection is made to the Internet network 2, to allow a requesting equipment to obtain information on a destination equipment (not represented in the figure), starting from the identification name of the latter and by means of the DNS system.

For this, module 1 serves to receive the query and to send the answer over the Internet network 2, at the same time as it serves for supervising the connection with the requesting equipment that makes the query.

Thus, when a requesting equipment wants to obtain information regarding a destination equipment, it is connected through the Internet network 2 with module 1 by means of which the connection is set up with the requesting equipment.

Module 1 is connected to a DNS query data analysis module 3 that serves for analysing the queries made by the requesting equipment, checking the header of the DNS protocol query, verifying whether the query is of the appropriate type, and analysing what class it belongs to (in general, Internet), passing the result of the analysis carried out to a request administration module 4 that obtains the necessary information and delivers it to a QNAME parameter analysis module 5, which analyses said parameter. This parameter is used conventionally in the DNS protocol to send the identification name of the destination equipment, such as was commented in the section on background of the invention. The QNAME parameter is also represented by a series of labels separated by dots, to allow also the identification of different domains or areas in the Internet network 2 which in the specific case of the example of embodiment serves to identify the network domain wherein the DNS server or system is located.

In the system of the invention, also in the QNAME parameter information is included relative to the destination equipment on which information is requested, the database from which this information is obtained and the information required on said destination equipment, so that module 5 analyses all this information and the result is passed by it to the request administration module 4 that checks the internal database 6 (Master Files).

Also the request administration module 4 is connected to a module for database message composition/reception 9 that in the example of embodiment of FIG. 1, is connected to a database interface 11 to allow access to external relational databases 10 as is described below.

In the case in which the requested information is not stored in the internal database 6, module 5 informs the request administration module 4 of the external database 10 that it should access, so that said module 4 accesses the database message composition/reception module 9 by means of which the query is composed in the pertinent protocol, i.e. it carries out the transformation of the DNS protocol to the protocol used by the external relational database 10 that it is desired to access, this operation being carried out through a database interface 11, and the required information being received in the interface 11 that delivers it to the database message composition/reception module 9 which delivers the information to the request administration module 4.

In any one of the cases described, when the request administration module 4 has the requested information, it sends it to a database answer analysis module 7, which provides it with the necessary information to compose the answer, so that the request administration module 4, once all the information has been collected to compose the answer and that which it receives also from the DNS query data analysis module 3, delivers all this information to a DNS message composition module 8 that generates the message in the DNS protocol based on the information, sending it to the module for DNS query reception and answer transmission 1 by means of which the information is sent over the Internet network 2 to the requesting equipment.

In an embodiment of the invention, also in the QNAME parameter information is included regarding a password (access key), which within the process described is analysed by the request administration module 4 which generates the information to deny access to the required information in a manner equivalent to that commented for the case in which access is allowed to this information according to the description provided above.

Thus, for example, when a requesting equipment wishes to obtain information on a destination equipment, in the former the corresponding program is booted to carry out a DNS query. This query is passed through the different DNS servers until it arrives at the server which knows the answer. All this in a conventional manner.

When the query has been received by the server, its module for DNS query reception and answer transmission 1 supervises the connection with the requesting equipment in the manner already described.

At this stage it is necessary to point out that the server of the invention does not carry out queries to other servers, since when access is made to it, it is because it is desired to obtain a particular item of information and therefore it is the one that has the requested information.

Subsequently the DNS query data analysis module 3 checks that the DNS format is correct, and verifies the value that all the parameters of the query have except the QNAME parameter. The information obtained is sent to the request administration module 4 that delivers the information to the QNAME parameter analysis module 5 which obtains the information regarding the destination equipment on which it is desired to obtain information, as well as the information that is desired to obtain on the latter, the database to which access should be made to search for said data item and the necessary password to gain access to the information of the requested destination equipment. All this information passes again to the request administration module 4 for processing by the latter.

The request administration module 4, with the information obtained from the module 5 checks if the password is correct, queries the internal database 6 to check if it can give an answer directly, and in the event of not being able to give said answer it checks to which database 10 it should send the query, the process of obtaining the requested information being carried out in the manner already described.

When the request administration module receives the requested data on the destination equipment, the information is passed to the database answer analysis module 7 for the latter to define what is to be put in the answer field of the DNS protocol. Thus, for example, it defines what is to be put in the RDATA parameter of the answer field of the DNS protocol. This field passes again to the request administration module 4 which, together with the information it received from the DNS query analysis module 3 passes all the information necessary for the DNS message composition module 8 to compose the answer in DNS protocol format which is sent via the DNS query reception and answer transmission module 1 which serves to send it, over the Internet network 2 to the requesting equipment.

Figure 2:
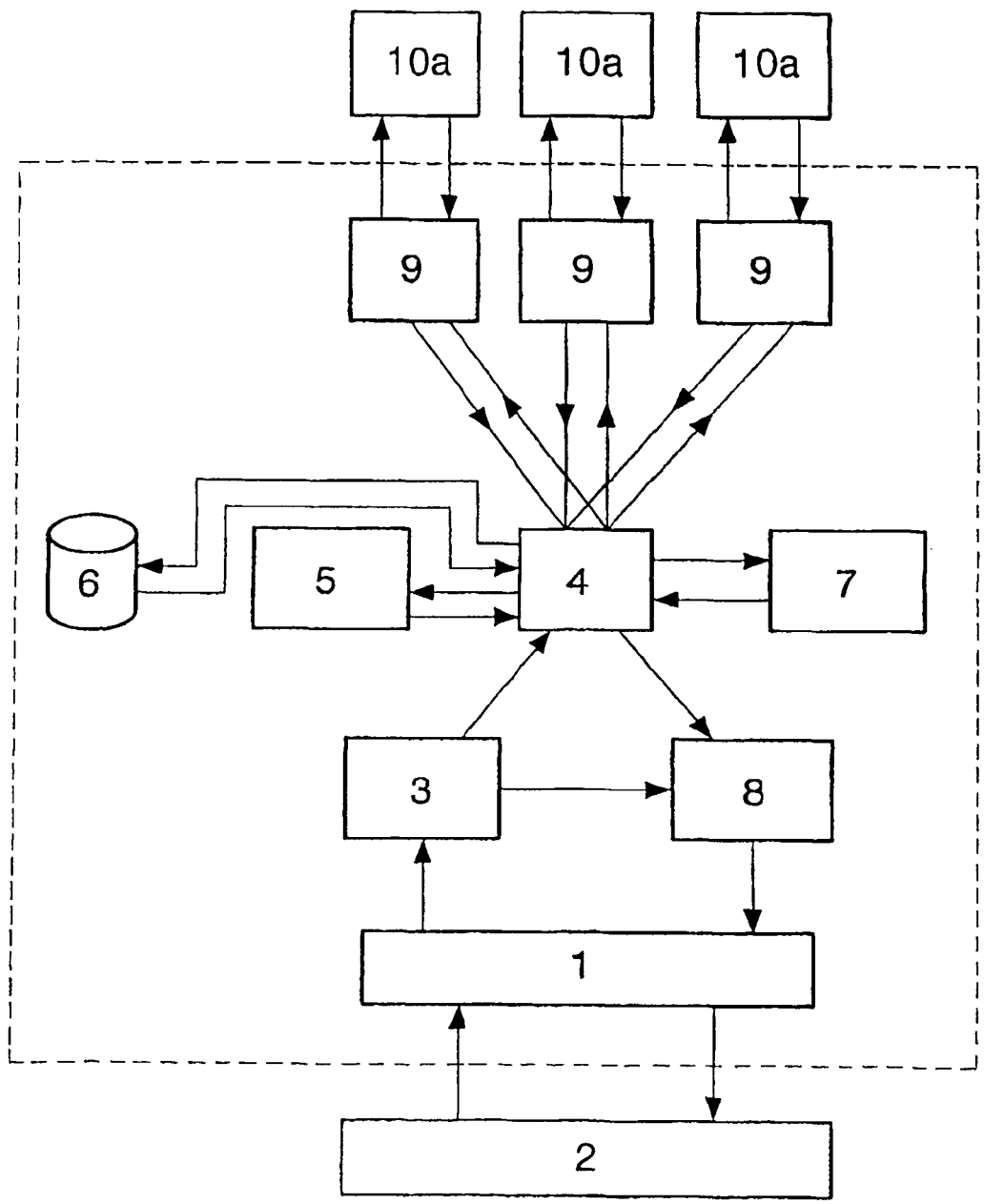
FIG. 2. Shows another example of embodiment of the invention in which the DNS system can access different external hierarchical databases.

In FIG. 2 an example of embodiment of the invention is shown equivalent to that described, but with the difference that in this case the external database is a hierarchical database 10*a*, in which case incorporation of the database interface 11 is not necessary, since the database message composition/reception module 9 has direct access thereto. Also in this example of embodiment, different databases 10*a* have been shown for which different database message composition/reception modules 9 are included, each one of which carries out the pertinent translation to the selected protocol, so that depending on what this is, the request administration module 4 selects one or another of the database message composition/reception modules 9, so that through the latter access is obtained to the corresponding hierarchical database 10*a*. Operation is identical to that described, with the exception mentioned.

Therefore, by means of the description made it is easily understood that an Internet user, making use of the DNS protocol, can access a mobile telephony network, in which case he will access, for example the database of the GSM network, to obtain his telephone number for example, and equally he can access an external database 10 or 10*a* belonging to any data network to obtain any type of information regarding a destination equipment, and all this starting from the identification name of said destination equipment, that conventionally is used to obtain the IP address of the latter by means of a DNS system.

The invention claimed is:

1. A Domain naming system for access to databases, which allows a requesting equipment to obtain an Internet address, assigned to a destination equipment, starting from an identification name of said destination equipment, the Domain naming system comprising:
   a query transmitter/receiver connected to the Internet network,
   a DNS query data analysis module,
   a DNS message composition module,
   a request administrator connected to the DNS query data analysis module and the DNS message composition module,
   an internal database, a DNS protocol parameter analysis module connected to the request administrator and effective to analyze at least one parameter of a DNS inquiry, at least one database message composition/reception module connected to the request administrator and connected to at least one external database, the database message composition/reception module effective to detect, by means of the DNS protocol parameter analysis module queries to the at least one external database and to obtain additional information on the destination equipment starting from the identification name of said destination equipment, the additional information including what database to access, information regarding the destination equipment, and information regarding an item of data desired to obtain on the destination equipment;

the request administrator also connected to a database answer analysis module effective to receive the additional information from the at least one external database (10, 10*a*) and from the internal database and to deliver the additional information to the DNS message composition module and the DNS message composition module sends the additional information on the destination equipment to the requesting equipment over the Internet network.

2. A Domain naming system for access to databases, according to claim 1, wherein the additional information also includes information regarding a password to the additional information, in order to, after verification thereof, allow access to said additional information.

3. A Domain naming system (DNS) for access to databases, according to claim 1, wherein the parameter conventionally contains the identification name of the destination equipment.

4. A Domain naming system for access to databases, according to claim 1, wherein the external database is a mobile telephony network in order to be able to obtain information regarding subscribers of said network.

5. A Domain naming system for access to databases, according to claim 1, wherein the external database is of a data network.

6. A Domain naming system for access to databases, according to claim 4, wherein a subscriber telephone number is obtained.

7. A Domain naming system for access to databases, according to claim 1, wherein the IP address varies in a dynamic way and randomly as a function of connections of the destination equipment.

8. A Domain naming system for access to databases, according to claim 1, further comprising at least one database interface connected to the at least one database message composition/reception module for access to the at least one external database.

9. A Domain naming system for access to databases, according to claim 8, wherein the at least one database interface is determined by APIs.

10. A Domain naming system for access to databases, according to claim 1, further comprising a plurality of database message composition/reception modules and a plurality of external databases.

* * * * *

UNITED STATES PATENT AND TRADEMARK OFFICE
CERTIFICATE OF CORRECTION

PATENT NO. : 7,246,133 B2
APPLICATION NO. : 10/483912
DATED : July 17, 2007
INVENTOR(S) : Velasco et al.

It is certified that error appears in the above-identified patent and that said Letters Patent is hereby corrected as shown below:

Title Page 1 Left-hand Column, under Item (73)
Change Assignee from "Vodaphone Group PLC" to --Vodafone Group PLC--

Signed and Sealed this
Twentieth Day of May, 2014

Michelle K. Lee
*Deputy Director of the United States Patent and Trademark Office*